(12) United States Patent
Karlin et al.

(10) Patent No.: US 6,557,890 B1
(45) Date of Patent: May 6, 2003

(54) HYBRID-TYPE DEVICE FOR INFLATING VEHICLE SAFETY EQUIPMENT

(75) Inventors: Mats Karlin, Vargada (SE); Torbjörn Skanberg, Hovas (SE)

(73) Assignee: Autoliv Development AB, Vargada (SE)

( * ) Notice: Subject to any disclaimer, the term of this patent is extended or adjusted under 35 U.S.C. 154(b) by 0 days.

(21) Appl. No.: 09/616,716

(22) Filed: Jul. 14, 2000

(30) Foreign Application Priority Data

Jul. 16, 1999 (DE) .......................... 199 33 551

(51) Int. Cl.[7] .............................................. B60R 21/28
(52) U.S. Cl. ........................................ 280/741; 280/737
(58) Field of Search ................................ 280/737, 741; 137/68.3, 68.13; 225/5; 102/530, 531

(56) References Cited

U.S. PATENT DOCUMENTS

| | | | | |
|---|---|---|---|---|
| 3,637,110 A | * | 1/1972 | Cirillo et al. ................... 222/3 |
| 3,758,131 A | | 9/1973 | Stephenson et al. .. 280/150 AB |
| 3,868,124 A | * | 2/1975 | Johnson ................ 280/150 AB |
| 3,884,497 A | * | 5/1975 | Massengill et al. ... 280/150 AB |
| 3,985,375 A | * | 10/1976 | Lewis et al. ................ 280/737 |
| 5,351,988 A | * | 10/1994 | Bishop et al. ............... 280/737 |
| 5,351,989 A | * | 10/1994 | Popek et al. ................. 280/737 |
| 5,536,039 A | * | 7/1996 | Cuevas ........................ 280/737 |
| 5,570,904 A | * | 11/1996 | Cuevas ........................ 280/737 |
| 5,582,425 A | * | 12/1996 | Skanberg et al. ........... 280/736 |
| 5,660,412 A | * | 8/1997 | Renfroe et al. ............. 280/737 |
| 5,670,738 A | * | 9/1997 | Storey et al. ................ 102/530 |
| 5,794,973 A | * | 8/1998 | O'Loughlin et al. ........ 280/737 |
| 5,821,448 A | * | 10/1998 | Hamilton et al. ........... 102/288 |
| 6,142,518 A | * | 11/2000 | Butt et al. .................... 280/741 |
| 6,168,197 B1 | * | 1/2001 | Paganini et al. ............ 280/735 |

FOREIGN PATENT DOCUMENTS

DE 2300577 7/1973

* cited by examiner

Primary Examiner—Lesley D. Morris
Assistant Examiner—Paul Royal, Jr.
(74) Attorney, Agent, or Firm—Dilworth & Barrese LLP

(57) ABSTRACT

The present invention relates to a hybrid-type device for inflating vehicle safety equipment with gas chamber for acceptance of compressed gases and at least two charges for the production of gas. The inflation devices is distinguished in that the two charges each have a mass of at least 5% of the mass of the compressed gas so that each charge can substantially increase the temperature of the gas and in that they are each arranged outside the gas chamber, on different sides thereof They can thus be ignited simply and precisely at predetermined without reciprocal impact.

32 Claims, 3 Drawing Sheets

HYBRID-TYPE DEVICE FOR INFLATING VEHICLE SAFETY EQUIPMENT

BACKGROUND OF THE INVENTION

Figure 1:
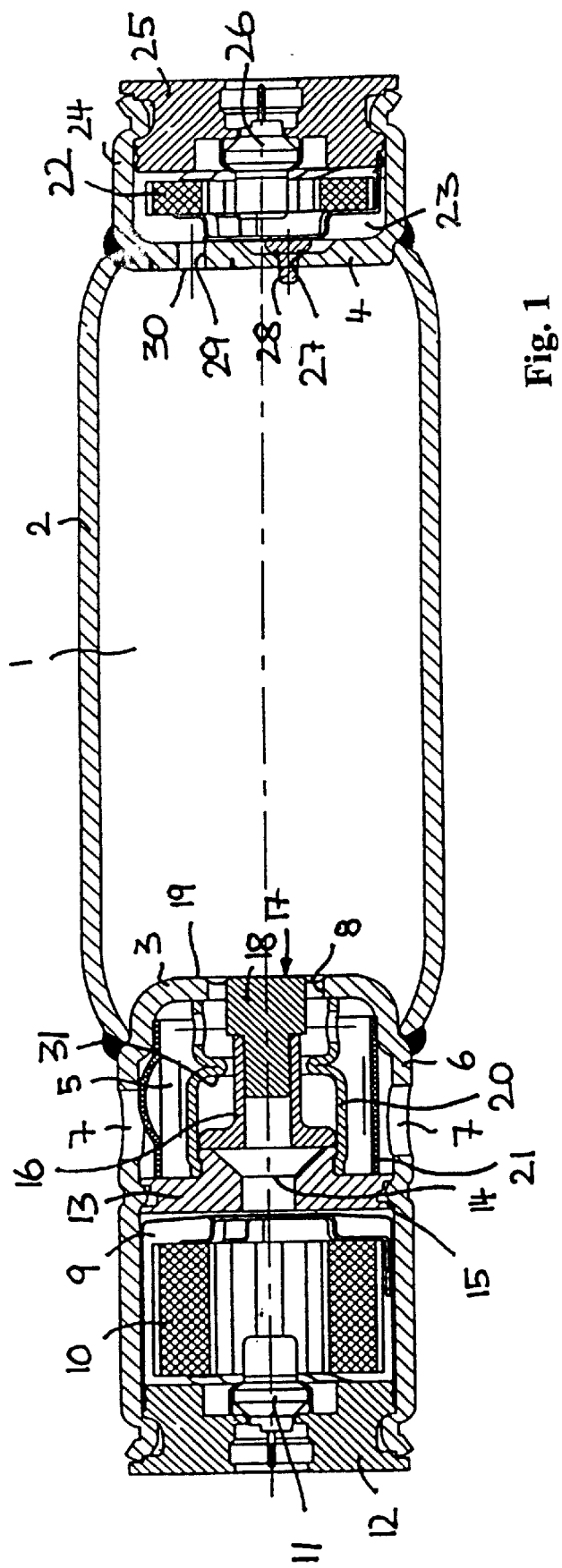

This invention relates to a hybrid-type device for inflating vehicle safety equipment with a gas chamber for acceptance of compressed gases and at least two charges for the production of gas.

Such hybrid-type inflating devices, in which the inflation of the corresponding device is achieved, for one thing by a pressurized gas, and for another by a gas produced by igniting a gas-producing pyrotechnic charge, is known for example, from U.S. Pat. No. 3,758,131 or DE-OS 23 00 577. The minimum of two gas-producing charges can be ignited independently or sequentially. In this manner, the inflation process can be adapted to various parameters such as, for example, the weight of the occupants, the distance of the occupants from the safety equipment, the temperature, the force of the impact and similar. A time delay between the actuation of the various charges causes a gentler but also longer-lasting inflation of the safety equipment.

With known hybrid type inflation devices, it was difficult, however, to ignite the charges precisely at the predetermined times and to achieve the desired inflation characteristics. For example, there was a risk that the second charge would ignite unintentionally, for example as a result of an electric arc or electric leakage or through a transfer of heat from the first gas charge ignited.

The interaction of the two charges is a particular problem when these gas charges are of larger sizes. On the other hand, it is desirable for larger charges to be used to achieve a corresponding volume of gas to inflate the safety equipment and to achieve the desired inflation characteristics.

Proposals have already been made to not use electric ignition to ignite the gas-producing charges, to avoid electric wires in the gas chamber and to prevent electric arcs or leakage losses. But this makes it difficult to activate the charges independently at times to be defined.

SUMMARY OF THE INVENTION

The present invention therefore relates to creating an improved inflation device of the type cited at the beginning that avoids the known disadvantages in the state of the art. In particular, an inflation device is created in which the gas-producing charges produce a sufficient quantity of gas and can be ignited simply, independently of each other, at different times.

According to the invention, this task is solved by an inflation device of the type cited at the beginning in that the two charges each have a mass of at least 5% of the mass of the compressed gas and are each arranged outside the gas chamber on different sides thereof The charges are therefore distances from each other and separated from the compressed gas in the gas chamber. There is no direct interaction between the charges upon ignition. In particular, thermal transfer from the charge ignited first to the second charge is prevented. Despite this, the two charges are sufficiently large. In particular, they are dimensioned such that each charge can cause a significant rise in temperature of the compressed gas in the gas chamber to influence the inflation process thereby. The charges can be ignited simply with an electric ignition initiator with no fear of a disruptive discharge or leakage losses. In particular, the two charges can be positioned at opposite ends of the gas chamber.

According to an advantageous development of the invention, pyrotechnic charges are used that produce carbon monoxide or other combustible gases. To oxidize these gases, the compressed inert gas stored in the gas chamber can be mixed with approximately 10%–20% oxygen ($O_2$). An advantageous inflation characteristic can thus be achieved by mixing the gases produced by the pyrotechnic charges with the compressed gas stored in the gas chamber.

The inflation device can work without material that are broken down, in particular, by pyrolysis and thus produce gas. The pyrotechnic charges are sufficiently large to produce the corresponding gas volumes by themselves. By mixing the gases produced by the pyrotechnic charges with the inert gas stored in the gas chamber, a substantial increase in the temperature of the inert gas can be achieved, to influence the inflation process accordingly.

According to a preferred embodiment of the invention, the gas chamber is formed essentially cylindrically and the charge is situated on the face opposite thereto. This prevents an undesirable reciprocal impact from the ignitable gas charges.

On the first side of the gas chamber, on which the first of the charges is situated, a gas chamber opening is preferably provided that leads to the safety equipment and is initially sealed with a corresponding seal. The compressed gas is therefore completely separated from the charges.

In a development of the invention, the charges are contained in separate charge chambers that each have a charge chamber opening. These charge chamber openings are initially sealed with corresponding seals. Expediently, each of the charges can be brought into a flow connection with the gas chamber and the compressed gas stored therein. This can be arranged by opening the corresponding openings, i.e., the gas chamber openings and/or the charge chamber openings.

Various methods can be provided to open the seals for the gas chamber opening and/or the charge chamber openings. For example, they can be activated from outside. According to a preferred embodiment of the invention, however, the seals are self-controlled, i.e., they are designed to be activated by the resultant gas pressure after ignition of the charges. Preferably, the seals for the gas chamber opening are designed such that they are opened by the expanding gas after ignition of any one of the charges. By ignition of at least one of the two charges, the resultant charge gas flows through and the compressed gas stored in the gas chamber flows out. The seals for the charge chamber opening are designed such that they are opened exclusively by the related charge, i.e., by the expanding gas after ignition of the corresponding charge. The ignition of the other charge preferably does not impact the seal for the other charge chamber.

In a development of the invention, to open the seal for the gas chamber opening, i.e., the opening through which the compressed gas in the gas chamber can exit, a piston can be provided that, in its initial state, sits in a related cylinder and that is impinged upon by the expanding gas from one of the charges after ignition thereof, and this, in such manner that the piston is moved through the gas chamber opening. Here the piston opens the seal that had initially kept the gas chamber opening closed. Expediently, the piston can be impinged upon by one of the gas-producing charges situated on the side of the gas chamber opening.

According to a preferred embodiment of the invention, the piston-cylinder device has a plug that is assigned to the charge, that is situated in the corresponding charge chamber opening and that seals the same, fluid-tight, in its initial state. If the gas-producing charge situated in the corresponding charge chamber is ignited, the resultant gas pressure in the charge chamber acts on the plug through the opening of the gas chamber, releases it from the charge chamber opening and drives it through the gas chamber opening. The seals on the gas chamber opening are thus opened.

The seals for the gas chamber opening preferably have a sealing washer made of a suitable matter, that is fitted over the gas chamber opening and covers it. The contact pressure that activates the seal is preferably applied by the gas pressure inside the gas chamber; the sealing washer is pressured into the gas chamber wall by the compressed gas, into which wall the gas chamber opening is built. In a development of the invention, the seals on the piston are supported, and the central section of the sealing washer can lie on the ends of the plug sealing the charge chamber opening.

An advantageous embodiment of the invention consists in the piston being situated, in its initial position, such that the cross-section of the gas chamber opening is reduced and, in its extended position, it frees the cross-section of the gas chamber opening. Various discharge speeds can be achieved for the gas exiting from the gas chamber. In the initial piston position, the gas chamber opening—with the seals open—has an annular cross-section that is enlarged when the piston is removed.

Preferably, the piston can lie with its end in the plane of the gas chamber opening. In particular, the head section of the piston has a larger diameter than that of the related cylinder and a smaller diameter that the gas chamber opening. The above-cited achievement of varying opening cross-sections for the gas chamber opening facilitates this.

In a development of the invention, the gases exiting the gas chamber do not expand directly into the safety equipment. A joint discharge chamber can be provided that can be brought into flow connection with the gas chamber as well as the charge chambers, directly or indirectly. All exiting gases first expand in the discharge chamber and from it through a discharge opening into the safety equipment.

Advantageously, the discharge chamber is located between the gas chambers and one of the discharge chambers and can be brought into flow connection with both of these, directly; in particular, the discharge chamber is situated coaxially to the longitudinal axis of the gas chamber, like a sandwich between it and one discharge chamber. The other charge on the opposite side of the gas chamber can be brought indirectly into flow connection with the discharge chamber. The gas produced by this charge first flows through the corresponding charge chamber opening to the gas chambers, from them into the discharge chamber and from there into the safety equipment. The different connections of the various chambers to the discharge opening permits multi-faceted, precise adaptation of the inflation characteristics to the parameters mentioned at the beginning.

To achieve various inflation characteristics, the charges are preferably different. In particular, they are of different sizes, i.e., the gas volume produced upon ignition and the resultant pressure are different from the individual charges. The mass of the two charges can come to approximately 5% to 20% of the mass of the gas stored in the gas chamber, while preferably one of the charges has a mass of about 5%–10%, and the other charge has a mass of about 10%–20% of the mass of the compressed gas. Furthermore, the charges can be of different chemical compositions; in particular, they can have different ignition or expansion speeds.

To adapt the inflation characteristics to the corresponding environmental and accident parameters, according to an advantageous embodiment of the invention, a control device is provided to control the charges that predetermines the ignition sequences of the charges. The inflation device can therefore be operated accordingly in different inflation modes.

In a first inflation mode, only the first of the charges is ignited by the control device. The second charge is not ignited; the related charge chamber remains sealed. In a second inflation mode, the second charge is ignited, while the first is not. This means that the plug sealing the charge chamber opening belonging to the first charge remains in its initial position, so that the gases exiting from the gas chamber must flow through the cross-section of the gas chamber opening, reduced by the plug cross-section. In the first inflation mode, on the other hand, the plug is driven out so that a larger gas chamber opening section is available and the gas can exit correspondingly faster.

In a third inflation mode, the two charges are ignited. A larger volume of gas accordingly flows into the safety equipment. Preferably, the two charges are ignited sequentially with a time delay.

BACKGROUND OF THE INVENTION

Figure 2:
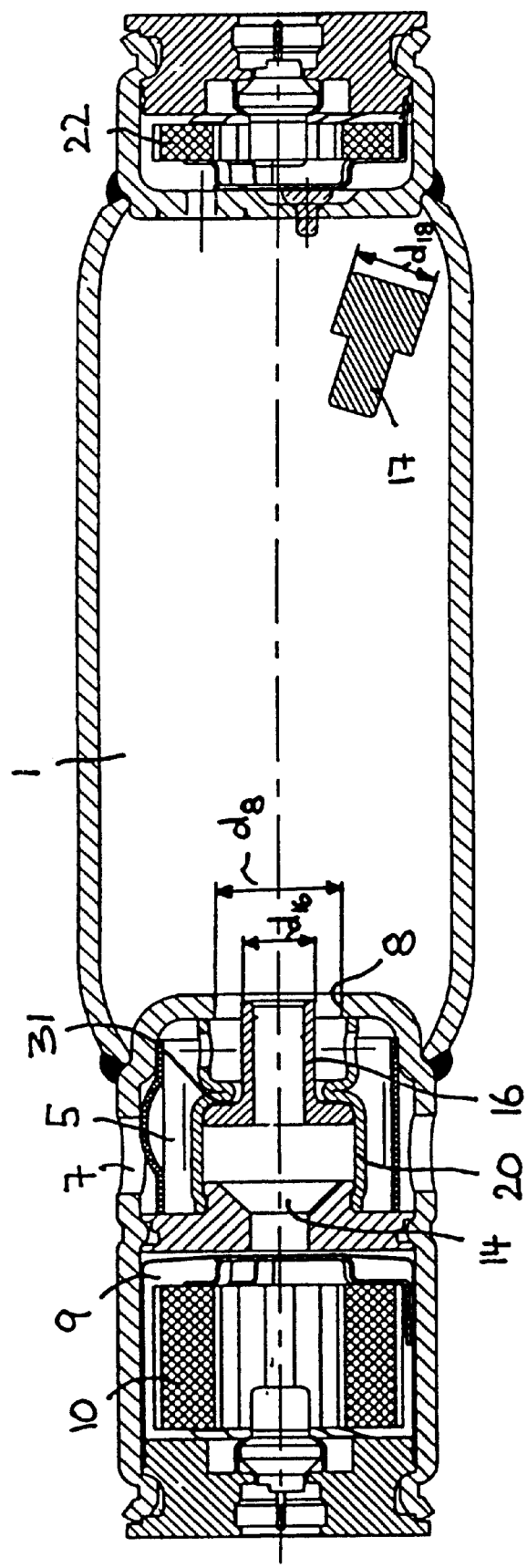
Figure 3:
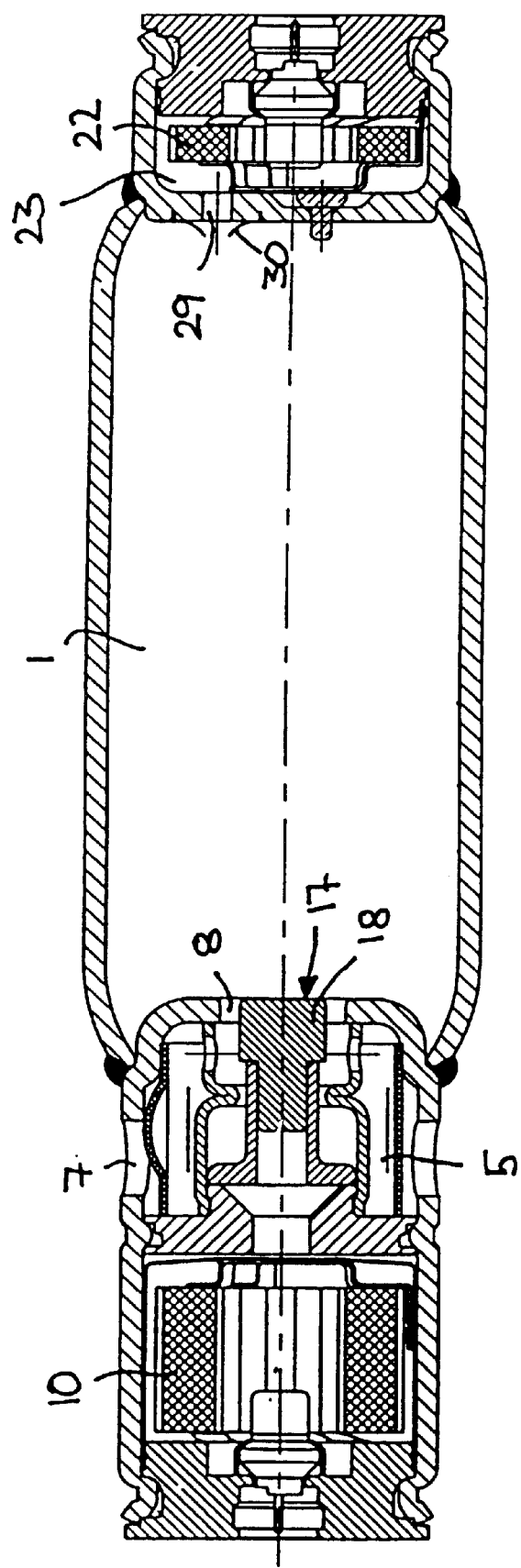

These and other characteristics can be derived from the following description and related drawings, in addition to the claims, and are explained in greater detail based on a preferred embodiment of the invention. The drawings show:

FIG. 1 a longitudinal section through an inflation device according to a preferred embodiment of the invention, where the device is shown in its initial state, FIG. 2 a sectional view of the inflation device similar to FIG. 1, where the device is shown after ignition of a first gas-producing charge on the left side according to FIG. 2, where the gas-producing charge on the right side according to FIG. 2 has not been ignited, and FIG. 3 is a sectional view similar to the above Figures, where the inflation device is shown after ignition of the second gas-producing charge on the right side according to FIG. 3, where the first gas-producing charge on the left side is not ignited.

DESCRIPTION OF THE PREFERRED EMBODIMENTS

The inflation device according to FIG. 1 has, as the central component, an essentially spherical gas chamber 1 that is delimited by a housing and a circumferential wall 2 as well as a first end wall 3 and a second end wall 4. The circumferential wall 2 is connected fluid-tight, particularly welded, to the end walls 3 or 4. Pressurized compressed gas is stored in the gas chamber 1, which gas can be released to a vehicle safety device, particularly an airbag, not shown in greater detail, as will be described below.

At the first end, i.e., on the left end of the gas chamber 1 according to FIG. 1, is a discharge chamber 5 that is essentially cylindrical and is situated coaxially to the longitudinal axis of gas chamber 1. The discharge chamber 5 is delimited from the gas chamber 1 by the first end wall 3 that, to this extent, forms a separating wall between the discharge chamber 5 and the gas chamber 1. In a circumferential wall 6 radially delimiting the discharge chamber 5, a discharge opening 7 is provided that is pointed radially outward and that forms a connection with the safety equipment.

In the first end wall 3 separating the discharge chamber 5 and the gas chamber 1 from each other, a recess is provided in the center that is known hereinafter as the gas chamber opening 8. The gas chamber 1 can be brought into flow connection with the discharge chamber 5 through the gas chamber opening 8, i.e., the gas in gas chamber 1 can flow through the gas chamber opening 8 into the discharge chamber 5 and from there to the safety equipment, as described below.

On the side of the discharge chamber 5 opposite to the gas chamber 1, is a first discharge chamber 9 that is also essentially cylindrical and is arranged coaxially to the longitudinal axis of the gas chamber 1 or the discharge chamber 5. A first gas-producing charge 10 is placed in the charge chamber 9, which charge 10 can be ignited by means of a first detonator 11, preferably electric. The detonator 11 is placed in a recess in an exterior wall 12 which delimits the charge chamber 9 from the exterior end of the inflation device. Radially, the charge chamber 9 is delimited from the circumferential wall 6, which simultaneously delimits discharge chamber 5 radially as well. Between the discharge chamber 5 and the charge chamber 9, a separating wall 13 is provided that has a passage recess that serves as the charge chamber opening 14 and—in the unsealed state—connects the first charge chamber 9 with the discharge chamber 5. The separating wall 13 is connected fluid-tight at its exterior circumference with the circumferential wall 6. Here, connectors are provided that are designed axially such that they fail when a predetermined pressure is achieved in the first charge chamber 9 after ignition of the corresponding charge 10, and the separating wall 13 can be pressed into the discharge chamber 5 by means of gas pressure in the charge chamber 9. A flange connection 14 is provided as the connector here, which has an exterior flange formed in one piece with the separating wall, projecting radially outward at the exterior circumference of the separating wall, and an interior flange projecting inward radially from the circumferential wall 6. The interior wall is formed from a bead on circumferential wall 6, formed by pressing on the originally cylindrical circumferential wall 6. The exterior flange at the separating wall can be deformed in an axial direction, which separating wall 13 can fail upon the corresponding pressure in the charge chamber 9 without the circumferential wall 6 expanding radially and without the risk of crack formation. The described failure of separating wall 13 serves to prevent explosion of the device in the case of excessively fast expansion or detonation speeds for charge 10, for example as a result of greater exterior thermal effects, as in the case of a fire. Here the connection of separating wall 13 with circumferential wall 6 is also designed to be weaker than the connection of the exterior wall 12 with the circumferential wall 6 so that the exterior wall 12 cannot, in any event, be exploded away from it. In the case of normal detonation of charge 10 in accordance with the regulations, the connection of the separating wall 13 withstands the pressure arising in charge chamber 9.

The first charge chamber opening 14 is formed as a cylinder toward the discharge chamber 5. As FIG. 1 shows, a cylinder section 16 is attached to the side of the separating wall 13 facing the discharge chamber 5 and is connected fluid-tight therewith. The first charge chamber opening 9 therefore has a cylindrical cross-section from the first charge chamber 9; connected thereto is a expanding section of a sphere, and a second cylinder section is connected thereto, which second cylinder section corresponds essentially in diameter to the first cylinder section. The first charge chamber opening 14 is sealed with a plug 17 that serves as a piston and is thrust into the cylinder section, facing the discharge chamber 5, of the charge chamber opening 14. The plug 17 has an essentially cylindrical head section 18 projecting over the charge chamber opening 14, which head section, on the one hand, reaches to the end of the tube or the cylinder section 16 and on the other, its end extends in the plane of the gas chamber opening 8, or more precisely, in approximately the plane in which the edge of the gas chamber opening 9, facing the gas chamber 1, lies.

The diameter $d_{18}$ of the head section 18 is larger than the outside diameter $d_{16}$ of the tube or cylindrical section 16, while the diameter of the head section 18 is smaller than the diameter $d_8$ of the gas chamber opening 8. Based on these differences in diameter, varying flow cross-sections can be created for the gas chamber opening 8. As long as the plug 17 is in its initial position, i.e., in its position sealing the charge chamber opening 14, the available cross-section of the gas chamber opening 8 is circular, and the full cross-section area of the gas chamber opening 8 is reduced by the cross-section area of the head section 18 of the plug 17. As soon as the plug 17 is removed, however, the cross-section area of the gas chamber opening 8, reduced by the cross-section of the cylinder 16, is available. The gas then flows accordingly more rapidly out of the gas chamber 1, i.e., the volume flowing through the gas chamber opening 18 is greater. This therefore results in a variable inflation characteristic.

The gas chamber opening 8 is initially sealed. A sealing washer 19 made of a suitable material serves as the seal; it is located on the first end wall 3, on the side of the gas chamber 1, and covers the gas chamber opening 8. The sealing washer 19 is situated on the plug 17; it lies on the end of the head section 18. It is pressed into the first end wall 3 by the gas pressure in the gas chamber 1, so that the pressure force necessary for sealing is present. The section of the first end wall 3 surrounding the gas chamber opening 8 is preferably designed as a flat sealing section.

20 designates a guide in the discharge chamber 5 that supports the separating wall 13 at the first end wall 3. The guide 20 is placed symmetrically to the longitudinal axis of the discharge chamber 5. It sits on a shoulder-shaped projection of the separating wall 13, on its side facing the discharge chamber 5 (See FIG. 1). Pierced openings are designed in the guide 20, through which the gas can flow. Furthermore, the guide 20 has a theoretical deformation section that permits axial creasing of the guide 20.

21 indicates a porous gas-permeable structure that is formed as a collar and designed as a mesh (see FIG. 1). It is situated in such manner that the gas exiting from discharge opening 7 flows through it.

On the side of the gas chamber 2 opposite the discharge chamber 5 and the first charge 10, is a second gas-producing charge 22 that is enclosed in a second charge chamber 23, analogous to the first charge 10. The charge chamber 23 is delimited, in the direction of gas chamber 1, by a second end wall 4 that forms, to this extent, a separating wall between the gas chamber 1 and the second charge chamber 23. Furthermore, the second charge chamber 23 is delimited by a circumferential wall 24 and an exterior wall 25, which forms the end of the whole cylinder-shaped inflation device. The second end wall 4 is made in one piece with the circumferential wall 24 and forms a sort of basin on its floor; the exterior wall 25 is thrust into this similarly to the exterior wall 12 of the open side of the circumferential wall 24 and is connected therewith by means of fluid-tight connectors, particularly a flange connection. As FIG. 1 shows, the circumferential wall 24 is pressed in from the outside, in the form of an annular circumferential groove in exterior wall 25, in the style of a flange.

The second charge 22 can be ignited similarly to the first charge 10, by an electric second detonator 26 that is placed in a corresponding central recess in the second exterior wall 25 (see FIG. 1).

The second charge 22 is smaller than the first charge 10, i.e., the gas volume produced by the second charge 10 is smaller than that on the side of gas chamber 1 facing the first charge 10. Furthermore, the second charge 22 is of a different chemical composition; its speed of ignition or expansion is different from that of the first charge 10.

For certain embodiments, a pyrotechnic charge can be used that produces carbon monoxide (CO) or other combustible gases. To oxidize these gases, the inert gas stored in gas chamber 1 is mixed with approximately 10%–20% oxygen ($O_2$). For example, according to a preferred embodiment, 12–16 g of powder is used in the first charge 10 and about 5–7 g of powder in the second charge 22. In gas chamber 1, about 100–120 g of cold compressed gas can be stored.

As FIG. 1 shows, two recesses are created in the second end wall 4 that separates the second charge chamber 23 from the gas chamber 1. A filler opening 27 serves to fill the gas chamber 1 with gas and is sealed with a suitable filler seal 28.

Furthermore, a second charge chamber opening 29 is provided that serves as the flow connection between the second charge chamber opening 23 and the gas chamber 1. The charge chamber opening 29 is initially sealed with a suitable seal. As FIG. 1 shows, a sealing washer 30 made of suitable material, covering the charge chamber opening 29, is provided on the side of the second and wall 3 facing the gas chamber 1. The section of the end wall 4 surrounding the second charge chamber opening 29 is designed as a flat sealing section. The sealing washer 30 is fastened to the end wall 4 in this section.

The second charge chamber opening 29 can be designed smaller in cross-section than the first charge chamber opening 14. The first charge chamber opening 14 can, in turn, be designed smaller in cross-section than the discharge opening 7.

The inflation device can be operated in three different inflation modes, with different ignition sequences. To control the gas-producing charges 10 and 22, a control device (not shown in the drawing) is provided, with which the two charges 10 and 22 can be controlled and ignited independently of each other.

In a first inflation mode, only the first gas-producing charge 10 is ignited, while the second gas-producing charge 22 remains unignited. The resultant method of operation is shown in FIG. 2. After ignition of the first gas-producing charge 10, gas pressure builds up in the first charge chamber 10, the resultant gas expands into the first gas chamber opening 8 and impinges upon the plug 17 with a corresponding force: the cylinder section 16, together with the plug 17, is pressed in the direction of the gas chamber 1 until the cylinder section 16 reaches the stop 31, which is formed of a interior flange projecting radially inward on guide 20 and an exterior flange on cylinder 16, projecting radially outward. This movement is supported by the conically-expanding section of the charge chamber opening 14, and the expanding gas also presses on the end of the cylinder section 16, projecting in this section, as shown in FIGS. 1 and 2.

As soon as the cylinder section 16 reaches the stop 31, the gas from the first gas-producing charge 10, continuing to expand, presses the plug 17 out of the cylinder section 16 so that the charge chamber opening 14 is opened by means of the hollow cylinder section 16 and the gas expanding from the first charge chamber 9 can expand into the discharge chamber 5 or the gas chamber 1.

Through the movement of the plug 17 through the gas chamber opening 8, the sealing washer 19 is removed and the gas chamber opening 8 is opened. Accordingly, the compressed gas can expand from the gas chamber 1 through the gas chamber opening 8 into the discharge chamber 5 and from there through the discharge opening 7 to the safety equipment. The gas exiting from the first charge chamber 9 can likewise flow through the discharge chamber 5 and its discharge opening 7. The second charge chamber 23 remains sealed and the second charge 22 does not produce any gas.

In a second inflation mode, in contrast to this, only the second gas-producing charge 22 is ignited, while the first gas-producing charge 10 remains unignited. The resultant method of action is shown in FIG. 3. Through the ignition of the second charge, the gas pressure builds up correspondingly in the second charge chamber 23 and presses of the sealing washer 30 so that the second charge chamber opening 29 is opened. The gas resulting from the second charge 22 can expand into gas chamber 1. This increases the gas pressure in gas chamber 1 such that subsequently the gas chamber opening 8 is also opened. The sealing washer 19 is pressed upon by the increase in the gas chamber pressure. The gases in gas chamber 1 expand through the gas chamber opening 8 into the discharge chamber 5 and from there flow through the discharge opening 7 to the safety device. In the second inflation mode, another inflation characteristic arises. For one thing, the available cross-section area of the gas chamber opening 8 is smaller since the plug 17 with its head section 18 blocks a part of the gas chamber opening 8. The head section 18 here blocks a larger portion of the gas chamber opening 8 than the cylinder section 16 that is thrust into the gas chamber opening 8 in the first inflation mode. For another, a smaller volume of gas is released by the second charge 22 so that overall the gas volume producing the inflation of the safety device is smaller.

In a third inflation mode, both the first gas-producing charge 10 and the second gas-producing charge 22 is ignited. Preferably, the two charges are ignited with a predetermined delay. Depending on the inflation characteristics desired, the first charge 10 or the second charge 22 can be ignited first. A repeated increase in pressure in the safety device can be achieved through the subsequent ignition of the other charge, and furthermore, the pressure available can be maintained over a longer period.

What is claimed is:

1. Device for inflating vehicle safety equipment with a chamber (1) filled with compressed gas and at lit two pyotechnic charges structured and arranged for producing gas upon ignition, wherein
   each of said charges (10, 22) has a mass of at least 5% of mass of the compressed gas in said chamber (1),
   said two charges (10, 22) are situated outside said gas chamber (1) on different sides thereof,
   said gas chamber (1) is essentially cylindrical and said charges (10,22) are situated on opposite ends thereof, and
   on a first side end wall (3) of said gas chamber (1), on which a first (10) of said charges (10, 22) is situated, a gas chamber opening (8), connectable with the safety equipment, and a seal (19), for Initial sealing of said gas chamber opening (8), are provided.

2. Inflation device according to claim 1, wherein at least one of said charges (10,22) is structured and arranged to generate a combustible gas upon ignition, and said compressed gas stored in said gas chamber (1) is oxidizable by said combustible gas thus generated.

3. Inflation device according to claim 2, wherein said combustible gas is carbon monoxide and said oxidizable gas is oxygen.

4. Inflation device according to claim 3, wherein said compressed gas stored in said gas chamber (1) comprises approximately 10%–20% by volume of oxygen.

5. Inflation device according to claim 1, wherein said compressed gas stored in said gas chamber (1) comprises at least 80% by volume of an inert gas.

6. Inflation device according to claim 5, wherein said inert gas is argon or helium.

7. Inflation device according to claim 1, additionally comprising a discharge chamber (5) provided with a discharge opening (7) structured and arranged for connection with the safety equipment and to be brought into flow connection with said compressed gas chamber (1) and said charges (10, 22).

8. Inflation device according to claim 7, wherein said discharge chamber (5) is situated between said gas chamber (1) and one (10) of said charges (10, 22) and structured and arranged to be brought into flow connection directly therewith, and with said other charge (22) structured and arranged to be brought into flow connection with said discharge chamber (5) through said gas chamber (1).

9. Inflation device according to claim 1, additionally comprising a control device for control of said pyrotechnic charges (10, 22) and structured and arranged to control said pyrotechnic charges (10, 22) independently of one another such that different inflation modes can be set up.

10. Inflation device according to claim 9, comprising three inflation modes (i)–(iii):
    (i) in a first inflation mode, only a first one (10) of said pyrotechnic charges (10, 22) being ignited;
    (ii) in a second inflation mode, only a second (22) of said pyrotechnic charges (10, 22) being ignited; and
    (iii) in a third inflation mode, both said pyrotechnic charges (10, 22) being ignited.

11. Inflation device according to claim 10, wherein in said third inflation mode (iii), said charges (10, 22) are structured and arranged to be ignited in succession with a delay.

12. Inflation device according to claim 10, wherein said second (22) of said charges (10,22) is situated in a charge chamber (23) having a charge chamber opening (29) and a seal (30) provided for initial sealing of said charge chamber opening (29) prior to ignition, and upon ignition of said second charge (22), gas pressure builds up in said second charge chamber (23) and presses said seal which is a washer (30) such that said second charge chamber opening (29) is opened and gas resulting from said second charge (22) expands into said gas chamber (1) increasing gas pressure therein and subsequently opening said gas chamber opening (8).

13. Inflation device according to claim 12, wherein, upon ignition, compressed gas contained in said gas chamber (1) expands through said opening (8) into a discharge chamber (5) and flows through a second discharge opening (7) to the safety equipment.

14. Inflation device according to claim 1, additionally comprising two distinct charge chambers (9, 23) in which a respective one of each said two pyrotechnic charges (10,22) is situated, each said charge chamber (9, 23) being provided with a respective charge chamber opening (14, 29), and respective seals (17, 30) arranged for initial sealing of said respective charge chamber opening (14, 29) prior to ignition of said respective charge (10, 22).

15. Inflation device according to claim 14, additionally comprising a cylindrical support (16) mounted in one (14) of said respective charge chamber openings (14, 29) and upon which said respective seal (17) which is a piston is mounted, such that said respective piston (17) can be impinged by gas expanding from a respective one (10) of said charges (10, 20) after ignition thereof and driven through said gas chamber opening (8).

16. Inflation device according to claim 15, wherein said piston (17) comprised a plug situated in said respective charge chamber opening (14) and sealing the same fluid-tight, and structured and arranged to be released by gas expanding in said respective charge chamber (9) and drive through said gas chamber opening (8).

17. Inflation device according to claim 15, wherein said piston is situated adjacent said gas chamber opening (8).

18. Inflation device according to claim 15, wherein said piston (17) is structured and arranged such that in an initial position prior to ignition of said respective charge (10), said piston (17) at least partially blocks said gas chamber opening (8), and said piston (17) comprises a head section (18) having a diameter ($d_{18}$) larger than diameter ($d_{16}$) of said cylindrical section (16) and smaller diameter ($d_{18}$) than diameter of said gas chamber opening (8).

19. Inflation device according to claim 15, additionally comprising a sealing washer (19) supported upon said piston (17) and arranged to seal said gas chamber opening (8) prior to ignition of said respective charge (10).

20. Inflation device according to claim 14, wherein said seals (17, 30) arranged for the initial sealing of said respective charge chamber openings (14, 29) are each structured and arranged to be opened by expanding gas after igniting of said respective pyrotechnic charge (10, 22).

21. Inflation device according to claim 14, wherein each of said pyrotechnic charges (10, 22) is structured and arranged to be brought into flow connection with said gas chamber (1).

22. Inflation device according to claim 1, wherein the mass of said two charges (10, 22) lies approximately in a range of 5%–20% of the mass of the compressed gas stored in said gas chamber (1).

23. Inflation device according to claim 1, wherein the mass of one of said two charges (10,22) falls approximately in the range of 5%–10% of the mass of the compressed gas stored in said gas chamber (1) and the mass of the other of said two charges (10, 22) falls approximately in the range of 10%–20% of the mass of the compressed gas stored in said gas chamber (1).

24. Inflation device according to claim 1, wherein said seal (19) for the initial sealing of the gas chamber opening (8) is structured and arranged such that said seal (19) is opened by expanding gas from at least one of said two pyrotechnic charges (10,22) after ignition of the same.

25. Inflation device according to claim 1, wherein said charges (10, 22) are structured and arranged to be different from one another in at least one of size, chemical composition, ignition speed and expansion speed.

26. Vehicle safety equipment provided with an inflation device according to claim 1.

27. Inflation device according to claim 1, wherein said pyrotechnic charges (10, 22) and chambers (9, 23) housing the same are asymmetrically arranged about said gas chamber (1).

28. Device for inflating vehicle safety equipment with a chamber (1) filled with compressed gas and at least two pyrotechnic charges structured and arranged for producing gas upon ignition, wherein each of said charges (10, 22) has a mass of at least 5% of mass of the compressed gas in said chamber (1).

said two charges (10, 22) are situated outside said gas chamber (1) on different sides thereof, said gas chamber (1) is essentially cylindrical and said charges (10,22) are situated on opposite ends thereof, and on a first side of said gas chamber (1), on which a first (10) of said charges (10, 22) is situated, a gas chamber opening (8), connectable with the safety equipment, and a seal (19), for initial sealing of said gas chamber opening (8), are provided, comprising charge chambers (9, 23) in which said pyrotechnic charges (10, 22) are respectively situated, each said charge chamber (9, 23) provided with a respective charge chamber opening (14, 29) and a seal (17,30) structured and arranged for initial sealing of said charge chamber openings (14, 29) prior to ignition, a first (9) of said charge chambers (9, 23) comprising a detonator (11) for said respective charge (10) situated on a side thereof opposite said compressed chamber (1), a discharge chamber (5) situated between said first charge (9) and compressed gas chamber (1), a separating wall (13) provided between said first pyrotechnic charge chamber (9) and discharge chamber (5) and through which said charge chamber opening (14) is provided, a substantially cylindrical mount (16) situated over said charge chamber opening (14) and structured and arranged to receive said seal (17) which is a piston plug to seal said charge chamber opening (14) prior to ignition of said pyrotechnic charge (10), a guide (20) situated in said charge chamber (5) and structured and arranged to support the separating wall (13) at a first end wall (3) separating said discharge chamber (5) and said compressed gas chamber (1) and through which said gas chamber opening (8) is situated, pierced openings being provided through said guide (20) to permit flow of gas therethrough, said discharge chamber (5) being provided with a circumferential wall (6) connected fluid-tightly at an exterior circumference with said separating wall (13) and weaker than connection of an exterior wall (12) of said charge chamber (9) with said circumferential wall (6) on a side of said pyrotechnic charge (10) opposite said separating wall (13), said first charge chamber (14) being formed as a cylinder, said piston (17) in an initial position prior to ignition, being arranged to at least partially block said gas chamber opening (8), having a head section (18) with a diameter ($d_{18}$) larger than diameter ($d_{16}$) of said cylindrical mount (16) and smaller than diameter ($d_8$) of said gas chamber opening (8), said second pyrotechnic charge chamber (20) being provided with a detonator (26) on an opposite side thereof from said compressed gas chamber (1), said seal (30) for said second charge chamber opening being a sealing washer, and comprising a filler opening (27) for filling said gas chamber (1) with gas being sealed by a filler seal (28).

29. Inflation device according to claim 28, wherein said pyrotechnic charges (10, 22) and chambers (9, 23) housing the same are asymmetrically arranged about said gas chamber (1).

30. Inflation device according to claim 28, wherein, in a first inflation mode, gas pressure builds up in said first charge chamber (9), expands into said discharge chamber (5) and impinges upon said piston plug (17) which is pressed in a direction of said compressed gas chamber (1) until said cylindrical section (16) reaches a radially inwardly projecting stop (31) positioned upon said guide (20) mounted between said separating wall (13) and said first end wall (3) of said compressed gas chamber (1), resulting in said plug (17) being pressed out of said cylindrical section (16) such that said charge chamber opening (14) communicates said charge chamber (9) with said discharge chamber (5) and said gas chamber opening (8) is opened such that compressed gas can expand from said gas chamber (1) through said gas chamber opening (8) into said discharge chamber (5) and through a second discharge opening (7) provided in said discharge chamber (5) to the safety equipment.

31. Device for inflating vehicle safety equipment with a chamber (1) filled with compressed gas and at least two pyrotechnic charges structured and arranged for producing gas upon ignition, wherein each of said charges (10, 22) has a mass of at least 5% of mass of the compressed gas in said chamber (1), said two charges (10, 22) are situated outside said gas chamber (1) on different sides thereof, said gas chamber (1) is essentially cylindrical and said charges (10,22) are situated on opposite ends thereof, and on a first side of said gas chamber (1), on which a first (10) of said charges (10, 22) is situated, a gas chamber opening (8), connectable with the safety equipment, and a seal (19), for initial sealing of said gas chamber opening (8), are provided, a control device for said pyrotechnic charges (10, 22) structured and arranged for control of said pyrotechnic charges (10, 22) and structured and arranged to control said pyrotechnic charges (10, 22) independently of one another such that different inflation modes can be set up, comprising three Inflation modes (i)–(iii):
(i) in a first inflation mode, only a first one (10) of said pyrotechnic charges (10, 22) being ignited;
(ii) in a second inflation mode, only a second (22) of said pyrotechnic charges (10, 22) being ignited; and
(iii) in a third inflation mode, both said pyrotechnic charges (10, 22) being ignited, comprising charge chambers (9, 23) in which said pyrotechnic charges (10, 22) are respectively situated, each said charge chamber (9, 23) provided with a respective charge chamber opening (14, 29) and seal (17, 30) structured and arranged for initial sealing of said charge chamber openings (14, 29) prior to ignition, a first (9) of said charge chambers (9,23) comprising a detonator (11) for said respective charge (10) situated on a side hereof opposite said compressed gas chamber (1), a discharge chamber (5) situated between said first charge chamber (9) and compressed gas chamber (1), a separating wall (13) provided between said first pyrotechnic charge chamber (9) and discharge chamber (5) and through which said charge chamber (14) is provided, a substantially cylindrical mount (16) situated over said charge chamber opening (14) and structured and arranged to receive said seal (17) which is a piston plug to seal said charge chamber opening (14) prior to ignition of said pyrotechnic charge (10), a guide (20) situated in said discharge chamber(5) and structured and arranged to support the separating wall (13) at a first end wall (3) separating said discharging chamber (5) and said compressed gas chamber (1) and through which said gas chamber opening (8) Is situated, pierced openings being provided through said guide (20) to permit flow of gas therethrough, said discharge chamber (5) being probed with a circumferential wall (6) connected fluid-tightly at an exterior circumference with said separating wall (13) and weaker than connection of an exterior wall (12) of said charge chamber (9) with said circumferential wall (6) on a side of said pyrotechnic charge (10) opposite said separating wall (13), said first charge chamber opening (14) being formed as a cylinder, and said piston (17) In an initial position prior to ignition, being arranged to at least partially block said gas chamber opening (8), having a head section (18) with a diameter ($d_{18}$) larger than diameter ($d_{18}$) of said cylindrical mount (16) and smaller than diameter ($d_8$) of said gas chamber opening (8), said second pyrotechnic charge chamber (23) being provided with a detonator (26) on an opposite side thereof from said compressed gas chamber (1), said seal (30) for said second charge chamber opening (29) being a sealing washer, and comprising a filler opening (27) for filling said gas chamber (1) with gas and being sealed by a filler seal (28).

32. Inflation device according to claim 1, being built into vehicle safety equipment which is an air bag arrangement.

* * * * *